United States Patent
Hiraka (10) Patent No.: US 10,627,675 B2
(45) Date of Patent: Apr. 21, 2020

(54) PLANAR LIGHT SOURCE DEVICE, DISPLAY DEVICE AND LIGHT FLUX CONTROL MEMBER

(71) Applicant: Enplas Corporation, Saitama (JP)

(72) Inventor: Kensuke Hiraka, Saitama (JP)

(73) Assignee: Enpias Corporation, Saitama (JP)

( * ) Notice: Subject to any disclaimer, the term of this patent is extended or adjusted under 35 U.S.C. 154(b) by 0 days.

(21) Appl. No.: 16/090,333

(22) PCT Filed: Jan. 11, 2017

(86) PCT No.: PCT/JP2017/000527
§ 371 (c)(1),
(2) Date: Oct. 1, 2018

(87) PCT Pub. No.: WO2017/168930
PCT Pub. Date: Oct. 5, 2017

(65) Prior Publication Data
US 2019/0113806 A1   Apr. 18, 2019

(30) Foreign Application Priority Data
Mar. 30, 2016   (JP) ................. 2016-068400

(51) Int. Cl.
*F21V 21/00*   (2006.01)
*G02F 1/13357*   (2006.01)
(Continued)

(52) U.S. Cl.
CPC ........ *G02F 1/133606* (2013.01); *F21V 5/007* (2013.01); *F21V 5/08* (2013.01);
(Continued)

(58) Field of Classification Search
CPC ......... G02F 1/133606; G02F 1/133603; G02F 2001/133607
(Continued)

(56) References Cited

U.S. PATENT DOCUMENTS 8,083,380 B2 * 12/2011 Zhou .................. F21K 9/00
                                                362/311.02
8,876,350 B2 * 11/2014 Takeuchi .............. G09F 9/33
                                                349/67
(Continued)

FOREIGN PATENT DOCUMENTS

JP   2011-003549 A   1/2011

OTHER PUBLICATIONS

International Search Report from International Application No. PCT/JP2017/000527 dated Mar. 21, 2017.

*Primary Examiner* — Laura K Tso
(74) *Attorney, Agent, or Firm* — Brundidge & Stanger, P.C.

(57) ABSTRACT

This planar light source device comprises a base board, a light-emitting device and a diffusing plate. The light-emitting device includes a light-emitting element and a light flux control member. The light flux control member has an entry surface, an exit surface, and a gate mark. The entry surface and the exit surface are formed in such a manner that the illuminance distribution on the diffusing plate has an anisotropy wherein the light reaches farther in the directions of 1 or more predetermined horizontal angles φ than in other directions, when assuming that the light is emitted from the light-emitting device in a state wherein the light flux control member does not have the gate mark. The horizontal angle φ range of the gate mark includes any one among the 1 or more predetermined horizontal angles φ.

11 Claims, 9 Drawing Sheets

(51) Int. Cl.
 *F21V 5/00* (2018.01)
 *F21V 5/08* (2006.01)
 *F21Y 105/10* (2016.01)
 *F21Y 115/10* (2016.01)
(52) U.S. Cl.
 CPC .... *G02F 1/133603* (2013.01); *F21Y 2105/10* (2016.08); *F21Y 2115/10* (2016.08); *G02F 2001/133607* (2013.01)
(58) Field of Classification Search
 USPC .................................. 362/311.02, 97.1, 97.3
 See application file for complete search history.

(56) References Cited

U.S. PATENT DOCUMENTS

| | | | | |
|---|---|---|---|---|
| 2011/0128745 A1* | 6/2011 | Chen | ........................ | F21V 5/04 362/311.02 |
| 2011/0194279 A1* | 8/2011 | Kuo | ........................ | F21S 2/005 362/235 |
| 2013/0044496 A1* | 2/2013 | Seki | ........................ | H01L 33/507 362/311.02 |
| 2013/0107542 A1* | 5/2013 | Fukuda | ................. | G02B 3/0056 362/311.01 |
| 2014/0009944 A1* | 1/2014 | Fukuda | ................... | F21V 5/046 362/311.08 |
| 2014/0301085 A1* | 10/2014 | Hwang | ..................... | F21V 5/04 362/308 |
| 2015/0029727 A1* | 1/2015 | Ikeda | ........................ | F21V 5/00 362/311.01 |
| 2015/0211713 A1* | 7/2015 | Takatori | ............. | G02B 19/0047 362/311.02 |
| 2015/0219286 A1* | 8/2015 | Yoon | ........................ | H01L 33/58 362/311.02 |
| 2015/0262518 A1* | 9/2015 | Freeman | ................... | F21V 5/04 362/311.02 |
| 2015/0323729 A1* | 11/2015 | Takatori | ............. | G02F 1/133603 362/606 |

* cited by examiner

PLANAR LIGHT SOURCE DEVICE, DISPLAY DEVICE AND LIGHT FLUX CONTROL MEMBER

TECHNICAL FIELD

The present invention relates to a surface light source device, a display apparatus including the surface light source device, and a light flux controlling member used in the surface light source device.

BACKGROUND ART

In recent years, for the purpose of energy saving and downsizing, light emitting diodes (hereinafter also referred to as "LEDs") are used as light sources for lighting. Light emitting devices each having a combination of an LED and a light flux controlling member (lens) for controlling distribution of light emitted from the LED are used in place of, for example, fluorescent lighting and halogen lamps. Further, direct surface light source devices incorporating the light emitting devices in a lattice shape are used as a backlight in transmission type image display devices, such as liquid crystal display apparatuses (refer to, for example, PTL 1).

Figure 1:
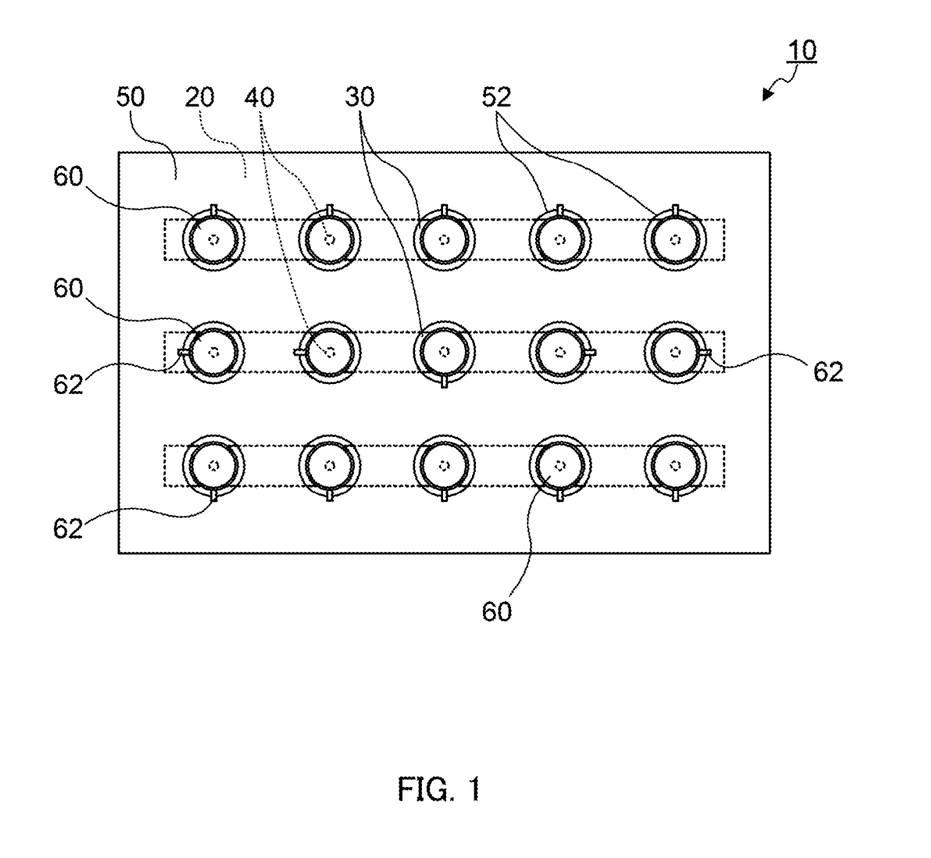
FIG. 1 illustrates a configuration of a surface light source device described in PTL 1.

FIG. 1 is a schematic plan view illustrating the configuration of surface light source device 10 described in PTL 1. In FIG. 1, an optical sheet (e.g., a diffusion plate) disposed on the front is omitted. As illustrated in FIG. 1, surface light source device 10 described in PTL 1 includes support board 20, circuit boards 30 fixed on support board 20, light emitting diodes 40 respectively mounted on circuit boards 30, reflective sheet 50 which is disposed on support board 20 and circuit boards 30 and which includes holes 52 respectively provided at positions corresponding to light emitting diodes 40, lenses 60 respectively disposed above light emitting diodes 40, and an optical sheet (not illustrated) disposed above lenses 60. Hole 52 in reflective sheet 50 has a diameter larger than that of lens 60, and lens 60 is fixed on circuit board 30 which is exposed via hole 52 of reflective sheet 50. Each lens 60 also includes protrusion 62 that protrudes toward the outside from the outer peripheral portion of lens 60. Protrusion 62 is formed to extend over the edge of hole 52 so as to face a part of reflective sheet 50. In surface light source device 10 described in PTL 1, as protrusions 62 of lenses 60 are placed on reflective sheet 50, separation of reflective sheet 50 from support board 20 can be prevented.

Lens 60 including protrusion 62 is more likely to generate luminance unevenness compared to lens 60 including no protrusion 62. In surface light source device 10 described in PTL 1, lenses 60 are disposed in such a manner that respective protrusions 62 are directed in different directions. This configuration may be able to reduce the luminance unevenness caused by protrusions 62. In the example illustrated in FIG. 1, lenses 60 are fixed so that each protrusion 62 faces the side among the four sides of support board 20, which is closest to lens 60.

CITATION LIST

Patent Literature

PTL 1
Japanese Patent Application Laid-Open No. 2011-3549

SUMMARY OF INVENTION

Technical Problem

In a surface light source device that includes a plurality of light emitting devices each having a combination of a light emitting element (light emitting diode) and a light flux controlling member (lens), a resin member produced by injection molding may be used as the light flux controlling member. Producing a light flux controlling member by injection molding leaves a gate mark (e.g., remaining gate) on a part of the outer peripheral portion of the light flux controlling member. Such a gate mark cannot emit light entering the light flux controlling member in an appropriate direction, thereby possibly causing luminance unevenness (dark part) on a light emitting surface of the surface light source device.

As a method for reducing luminance unevenness caused by gate marks in a surface light source device, light flux controlling members may be disposed in such a manner that their respective gate marks are directed in different directions as disclosed in PTL 1. However, this method merely allows luminance unevenness caused by the gate marks to become less prominent by randomly positioning dark parts caused by the gate marks on the light emitting surface of a surface light source device. Therefore, the method has a disadvantage such that it is difficult to predict the luminance distribution on the light emitting surface of the surface light source device until the light flux controlling members are actually disposed. For example, the luminance unevenness caused by gate marks may even become worse depending on the directions of the gate marks of the light flux controlling members.

An object of the present invention is to provide a surface light source device which includes a light flux controlling member having a gate mark, and in which luminance unevenness on the light emitting surface thereof caused by the gate mark can be suppressed regardless of the direction of the light flux controlling member therein. Another object of the present invention is to provide a display apparatus including the surface light source device, and a light flux controlling member used in the surface light source device.

Solution to Problem

A surface light source device according to the present invention includes a substrate; at least one light emitting device including a light emitting element disposed on the substrate, and a light flux controlling member which is disposed above the light emitting element so that the central axis of the light flux controlling member coincides with the optical axis of the light emitting element and which is configured to control a distribution of light emitted from the light emitting element; and a diffusion plate which is disposed above the light emitting device and which is configured to transmit light emitted from the light emitting device while diffusing the light. The light flux controlling member includes an incidence surface which is an inner surface of a recess disposed on the substrate side of the light flux controlling member so as to intersect the central axis; an emission surface disposed on the diffusion plate side of the light flux controlling member so as to intersect the central axis; and a gate mark located on a part of the outer peripheral portion of the light flux controlling member. In the light emitting device, when a horizontal angle φ is defined with the central axis as a reference axis and a predetermined direction orthogonal to the central axis as 0°, the incidence surface and the emission surface are formed in such a manner that, on the assumption that light is emitted from the light emitting device in a state where the light flux controlling member includes no gate mark, illuminance distribution on the diffusion plate has anisotropy such that the light reaches further in a direction of at least one predetermined horizontal angle φ compared to other directions, and the gate mark is located in such a manner that a horizontal-angle-φ range thereof includes one of the at least one predetermined horizontal angle φ.

A display apparatus according to the present invention includes the surface light source device according to the present invention, and a display member to be irradiated with light emitted from the surface light source device.

A light flux controlling member according to the present invention employs a configuration specified in the surface light source device according to the present invention.

Advantageous Effects of Invention

The light emitting device according to the present invention can suppress the generation of luminance unevenness caused by a gate mark (dark part) even with a light flux controlling member having the gate mark. Therefore, the surface light source device and display apparatus according to the present invention both have low luminance unevenness on a light emitting surface and low illuminance unevenness on a display surface.

DESCRIPTION OF EMBODIMENTS

Hereinafter, a surface light source device, a display apparatus, and a light flux controlling member all according to the present invention will be described in detail with reference to the accompanying drawings. In the following description, as a representative example of the surface light source device of the present invention, described is a surface light source device suitable for a backlight of a liquid crystal display apparatus or the like, in which light emitting devices are disposed in a lattice shape. The surface light source device may be used as a display apparatus by combining with a display member (e.g., a liquid crystal panel) to be irradiated with light emitted from the surface light source device.

(Configurations of Surface Light Source Device and Light Emitting Device)

Figure 2A:
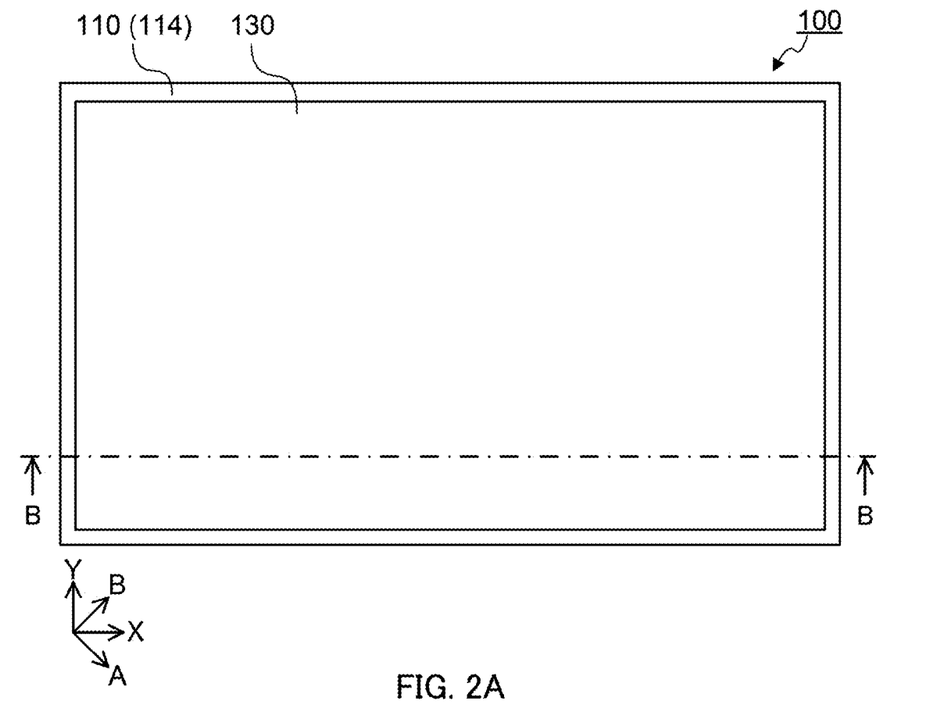
FIGS. 2A and 2B illustrate a configuration of a surface light source device according to an embodiment of the present invention.
Figure 2B:
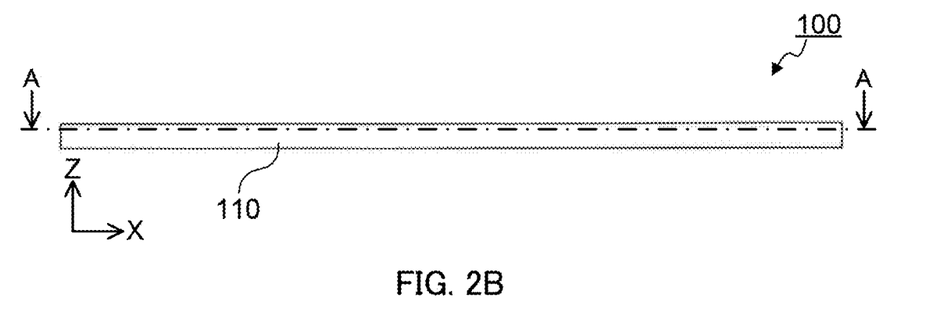
Figure 3A:
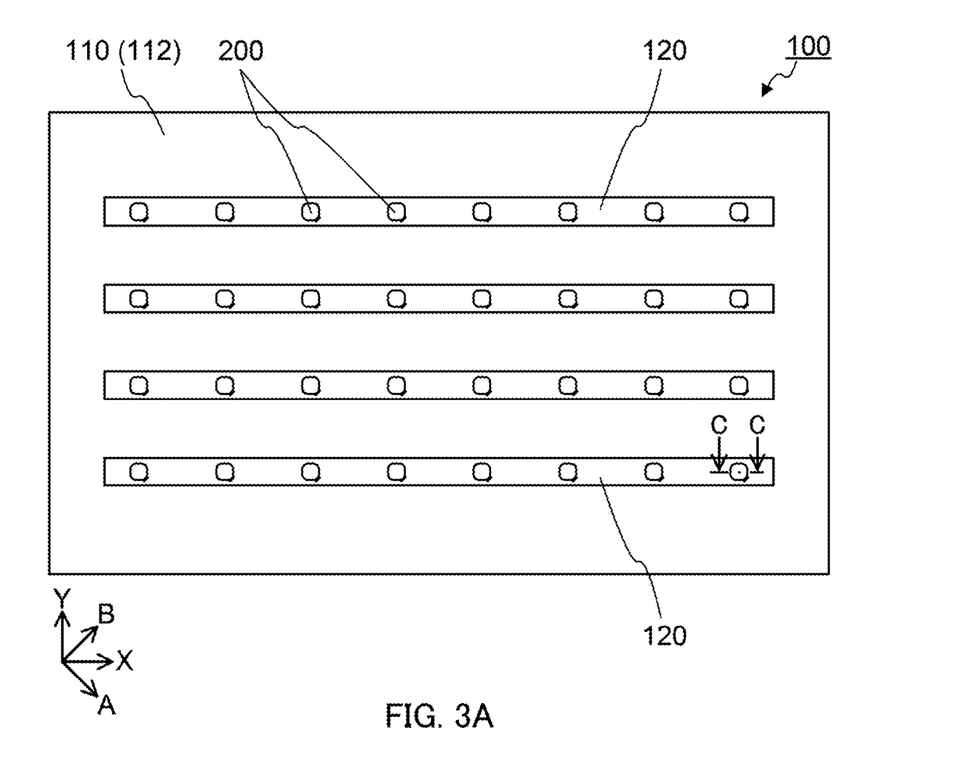
FIGS. 3A and 3B are cross-sectional views of the surface light source device according to the embodiment of the present invention.
Figure 3B:
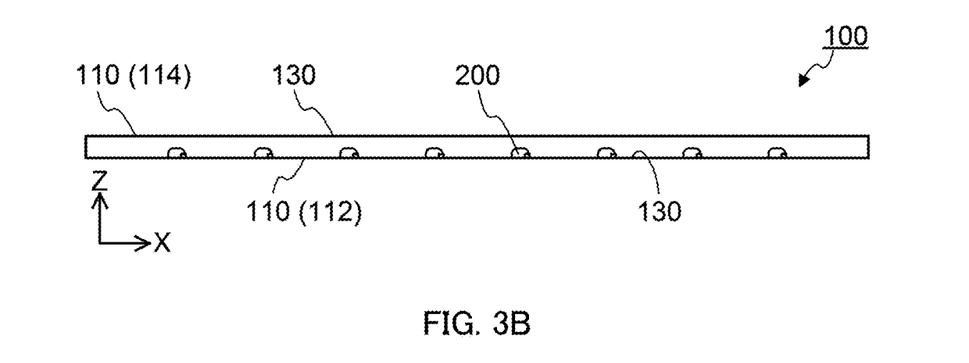
Figure 4:
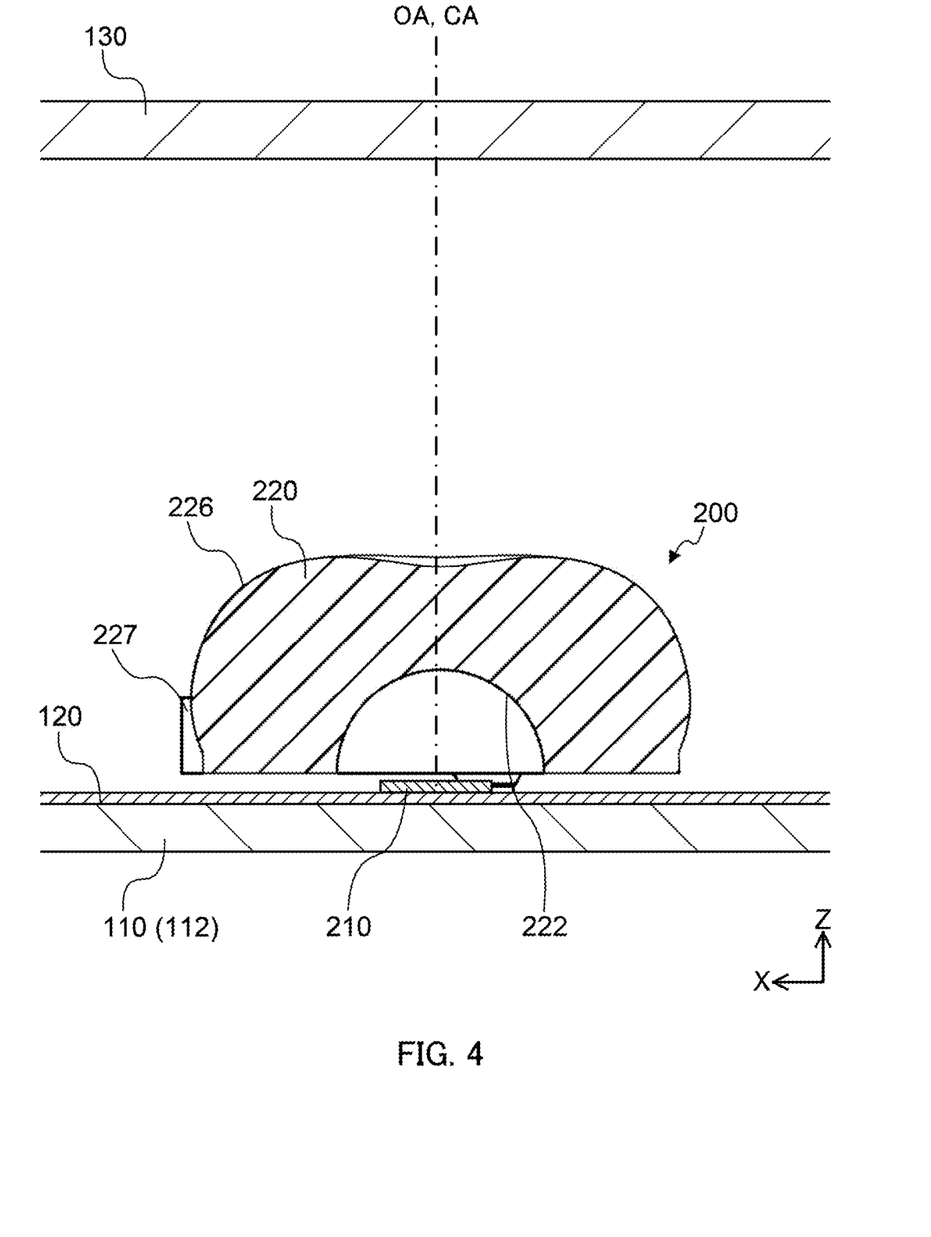
FIG. 4 is a partially enlarged cross-sectional view of the surface light source device according to the embodiment of the present invention.

FIGS. 2A to 4 illustrate a configuration of surface light source device 100 according to an embodiment of the present invention. FIG. 2A is a plan view of surface light source device 100 according to the embodiment of the present invention, and FIG. 2B is a front view of the same. FIG. 3A is a cross-sectional view taken along line A-A of FIG. 2B, and FIG. 3B is a cross-sectional view taken along line B-B of FIG. 2A. FIG. 4 is a partially enlarged cross-sectional view of surface light source device 100. FIG. 4 illustrates a cross section taken along line C-C of FIG. 3A.

As illustrated in FIGS. 2A, 2B, 3A, 3B and 4, surface light source device 100 includes casing 110, a plurality of substrates 120, a plurality of light emitting devices 200, and diffusion plate 130.

Casing 110 is a cuboidal hollow body which includes bottom plate 112 and top plate 114 facing and parallel to each other. The inner surface of bottom plate 112 functions as a diffusion and reflection surface. Top plate 114 of casing 110 is provided with an opening. Light diffusion member 130 is disposed so as to cover the opening, and functions as a light emitting surface of surface light source device 100. The size of the light emitting surface is, for example, about 400 mm×700 mm.

Substrates 120 are fixed on bottom plate 112 of casing 110 in such a manner that they are parallel to each other at regular intervals. Light emitting devices 200 are mounted on one substrate 120 in line at regular intervals. This configuration leads to light emitting devices 200 disposed on bottom plate 112 in a lattice shape. In the present embodiment, four substrates 120 each extending in the X-direction are arranged in the Y-direction, in the drawing. On each substrate 120, eight light emitting devices 200 are arranged in the X-direction. This configuration leads to 32 light emitting devices 200 disposed in a substantially square lattice shape. One large substrate 120 may be disposed in place of the plurality of substrates 120. In this case, a plurality of light emitting devices 200 is disposed on one substrate 120 in a lattice shape.

Light emitting devices 200 each include light emitting element 210 and light flux controlling member 220. Light emitting element 210 is a light source of surface light source device 100, and is mounted on substrate 120. Light emitting element 210 is a light emitting diode (LED), such as a white light emitting diode.

Light flux controlling member 220 is a lens, and fixed on substrate 120. Light flux controlling member 220 controls the distribution of light emitted from light emitting element 210 to expand the traveling direction of the light to the surface directions of diffusion plate 130. Light flux controlling member 220 is disposed above light emitting element 210 so that central axis CA of light flux controlling member 220 coincides with optical axis OA of light emitting element 210 (refer to FIG. 4). Below-described incidence surface 222 and emission surface 226 of light flux controlling member 220 are rotationally symmetric (incidence surface 222 has circular symmetry, and emission surface 226 has four-fold symmetry), and rotation axes of the surfaces coincide with optical axis OA of light emitting element 210. As used herein, the rotation axes of incidence surface 222 and emission surface 226 are referred to as "central axis CA of light flux controlling member 220." "Optical axis OA of light emitting element 210" is a light beam that is in the center of three-dimensional light flux emitted from light emitting element 210.

Light flux controlling member 220 is formed by injection molding. Therefore, gate mark 227 is formed on a part of the outer peripheral portion of light flux controlling member 220. As a material for light flux controlling member 220, any light-transmissive resin which can be molded by injection molding and which can transmit light having a desired wavelength may be used. Examples of the light-transmissive resins include polymethylmethacrylate (PMMA), polycarbonate (PC) and epoxy resin (EP). The main feature of surface light source device 100 according to the present embodiment is in the configuration of light flux controlling member 220. Therefore, light flux controlling member 220 will be described in detail below.

In the present embodiment, light emitting devices 200 are disposed so that respective gate marks 227 therein are directed in the same direction (A-direction in the drawings).

Diffusion plate 130 is a plate-shaped member having light diffusivity, which transmits light emitted from light emitting device 210 while diffusing the light. Diffusion plate 130 is disposed above light emitting devices 200, and substantially parallel to substrates 120. Typically, diffusion plate 130 has a size substantially the same as a member to be irradiated (display member), such as a liquid crystal panel. For example, diffusion plate 130 is formed of a light-transmissive resin, such as polymethylmethacrylate (PMMA), polycarbonate (PC), polystyrene (PS) or styrene-methylmethacrylate copolymer resin (MS). To confer light diffusivity, fine irregularities are formed on the surface of diffusion plate 130, or light diffusion elements, such as beads are dispersed inside diffusion plate 130.

In surface light source device 100 according to the present invention, light flux controlling member 220 expands light emitted from corresponding light emitting element 210 for illuminating a broad range of diffusion plate 130. As described below, light distribution characteristics of light flux controlling member 220 in the directions along an array lattice of light emitting devices 210 (X-direction and Y-direction) are different from that in the diagonal directions of the array lattice (A-direction and B-direction). This enables substantially uniform illumination of the inner surface of diffusion plate 130. The light reaching diffusion plate 130 from each light flux controlling member 220 passes through diffusion plate 130 while being diffused. Consequently, surface light source device 100 according to the present invention can uniformly illuminate a planar member to be irradiated (i.e., display member, such as a liquid crystal panel).

(Configuration of Light Flux Controlling Member)

Figure 5A:
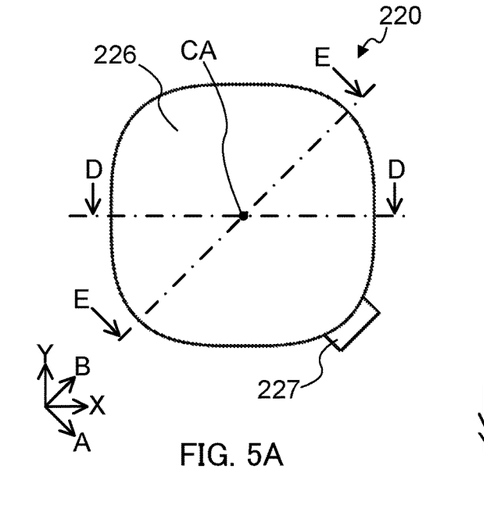
FIGS. 5A to 5E illustrate a configuration of a light flux controlling member according to an embodiment of the present invention.
Figure 5B:
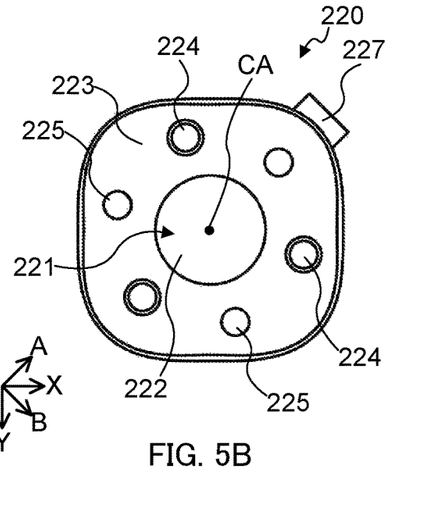
Figure 5C:
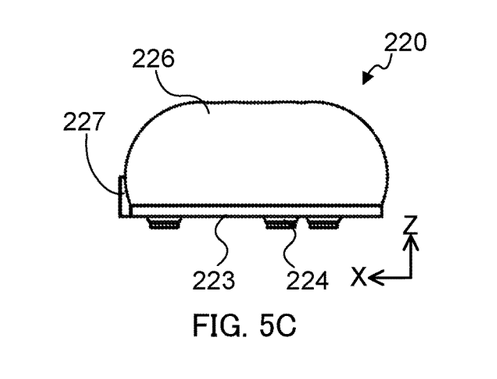
Figure 5D:
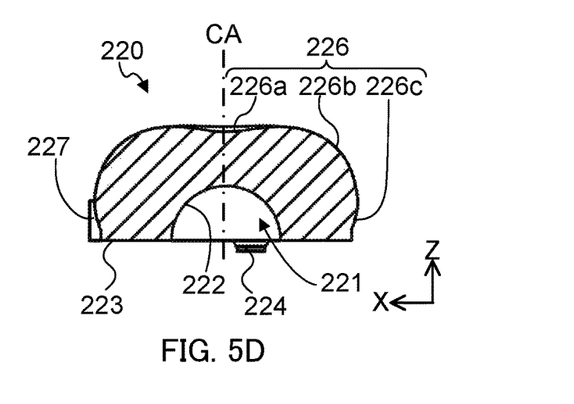

FIGS. 5A to 5D illustrate a configuration of light flux controlling member 220. FIG. 5A is a plan view, FIG. 5B is a bottom view and FIG. 5C is a back view of light flux controlling member 220, and FIG. 5D is a cross-sectional view taken along line D-D of FIG. 5A.

As illustrated in FIGS. 5A to 5D, light flux controlling member 220 includes incidence surface 222 that is an inner surface of recess 221 disposed on the substrate 120 side, rear surface 223, a plurality of legs 224, a plurality of ejector pin marks 225, emission surface 226 disposed on the diffusion plate 130 side, and gate mark 227 located on a part of the outer peripheral portion of light flux controlling member 220.

Recess 221 is disposed on the substrate 120 side (rear side) so as to intersect central axis CA (optical axis OA of light emitting element 210) in light flux controlling member 220. The inner surface of recess 221 functions as incidence surface 222. That is, incidence surface 222 is disposed so as to intersect central axis CA (optical axis OA). Incidence surface 222 allows most of light emitted from light emitting element 210 to enter light flux controlling member 220 while controlling the traveling direction of the light. Incidence surface 222 intersects central axis CA of light flux controlling member 220, and is rotationally symmetric with central axis CA as the rotation axis. In the present embodiment, incidence surface 222 has circular symmetry.

Rear surface 223 is a flat surface which is on the substrate 120 side, and extends in the direction(s) orthogonal to central axis CA (i.e., radial directions) from the opening edge of recess 221. Recess 221 is formed in a central portion of rear surface 223.

Legs 224 are cylindrical members protruding toward the substrate 120 side from rear surface 223. Legs 224 allow for positioning of incidence surface 222 and emission surface 226 at appropriate places relative to light emitting element 210. Leg 224 may have any height, and for example, about 1 mm. The number of legs 224 may be any number that is two or more. For stably supporting light flux controlling member 220, the number of legs 224 is preferably three or more. In the present embodiment, light flux controlling member 220 includes three legs 224. For reducing the occurrence of trouble during injection molding, legs 224 are preferably disposed symmetrically relative to a virtual plane which passes through central axis CA and gate mark 227, and is parallel to central axis CA.

Ejector pin marks 225 are formed on rear surface 223 by pushing with ejector pins during release from a mold after the injection molding. The size and number of ejector pin marks 225 are not limited, and appropriately selected in consideration of deformation during the release or the like. In the present embodiment, three ejector pin marks 225 are formed on rear surface 223. For reducing the occurrence of trouble during the injection molding, the portions to be pushed with ejector pins (i.e., the positions of ejector pin marks 225) are preferably located symmetrically relative to a virtual plane which passes through central axis CA and gate mark 227, and is parallel to central axis CA.

Emission surface 226 is disposed on the diffusion plate 130 side (front side) of light flux controlling member 220 so as to intersect central axis CA. Emission surface 226 emits the light entering light flux controlling member 220 toward the outside while controlling the traveling direction of the light. Emission surface 226 has n-fold symmetry, whose outer edge has a substantially n-polygonal shape (n is the number of the corners of the n-polygonal shape) (where n is an integral number of three or more). In the present embodiment, emission surface 226 has four-fold symmetry, whose outer edge has a substantially quadrangular shape. Hereinafter, "first cross section" is defined as a cross section including central axis CA and the midpoint of a side of the substantially n-polygonal shape (for example, a cross section taken along line D-D in FIG. 5A), and "second cross section" is defined as a cross section including central axis CA and a corner of the substantially n-polygonal shape (for example, a cross section taken along line E-E in FIG. 5A).

Emission surface 226 includes first emission surface 226a positioned in a predetermined range about central axis CA, and second emission surface 226b continuously formed from the periphery of first emission surface 226a.

First emission surface 226a is a curved surface recessed relative to diffusion plate 130. In the present embodiment, first emission surface 226a has the same curvature in the first cross section and the second cross section.

Second emission surface 226b is a smoothly curved surface which protrudes toward diffusion plate 130, and is positioned at the periphery of first emission surface 226a. In the present embodiment, second emission surface 226b has curvature smaller in the second cross section than in the first cross section. By employing the curvature smaller in a part corresponding to each corner of the substantially n-polygonal shape than in a part corresponding to each side of the substantially n-polygonal shape, light emitted from the part corresponding to each corner can travel further than light emitted from the part corresponding to each side. Consequently, light emitted from one light emitting device 200 illuminates the inner surface of diffusion plate 130, substantially in the shape of n-polygon.

In addition, second emission surface 226b includes overhanging part 226c which protrudes to the outside in the direction(s) orthogonal to central axis CA compared to the outer edge of second emission surface 226b. Providing overhanging part 226c allows for further use of part of light emitted from light emitting element 210, which has a large angle relative to optical axis OA compared to the other part of the light, as light illuminating diffusion plate 130.

Figure 6A:
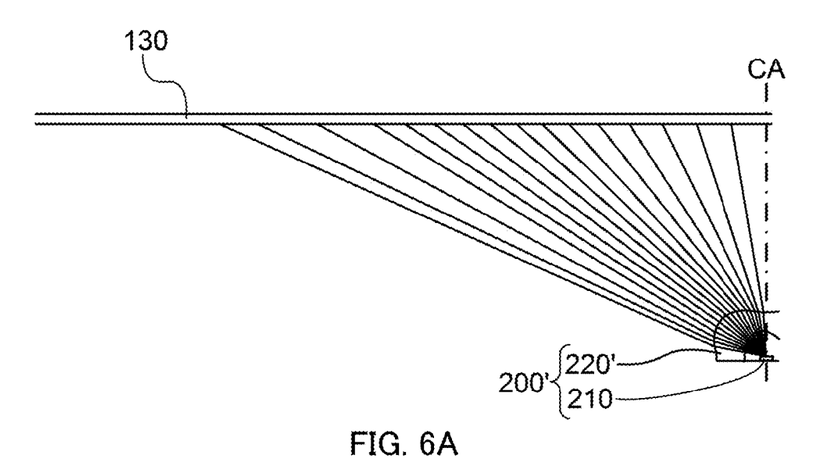
FIGS. 6A and 6B are schematic views illustrating optical paths in a surface light source device having a light flux controlling member including no gate mark.
Figure 6B:
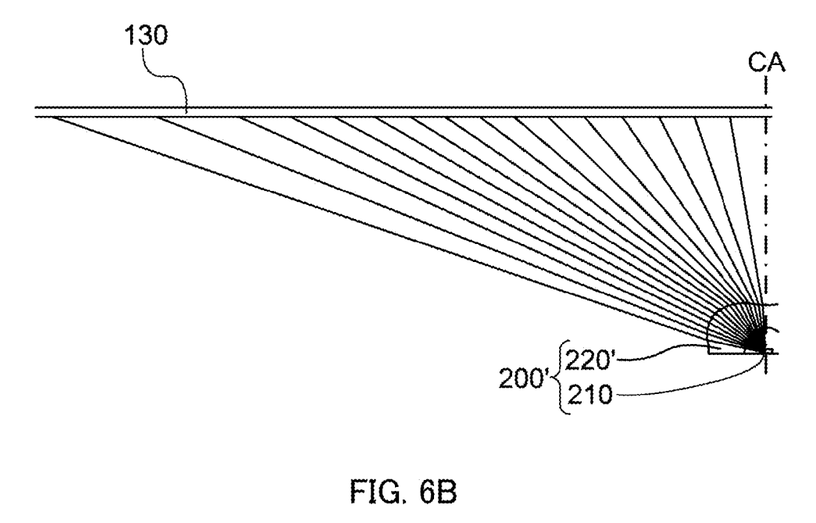

FIGS. 6A and 6B are schematic views illustrating optical paths in a surface light source device including light emitting device 200' that has light flux controlling member 220' including no gate mark 227, in place of light flux controlling member 220. For showing the light control by incidence surface 222 and emission surface 226, the optical paths in the surface light source device including light emitting device 200' that has light flux controlling member 220' including no gate mark 227 are illustrated in FIGS. 6A and 6B. The only difference between light flux controlling members 220 and 220' is whether gate mark 227 is present or not. FIGS. 6A and 6B illustrate the optical paths in the first cross section and the second cross section, respectively. In FIGS. 6A and 6B, hatching to light emitting element 210 and light flux controlling member 220' is omitted. Light beams indicated by the optical paths in FIGS. 6A and 6B are light beams with light emission angles (vertical angles θ) from 5° to 80° at every 5°.

As illustrated in FIGS. 6A and 6B, in the first and second cross sections, light which is emitted from light emitting element 210 at a relatively small light emission angle is controlled, while being expanded, by light flux controlling member 220' to travel toward a region close to central axis CA on the inner surface of diffusion plate 130. This enables uniform irradiation of a region directly above light emitting device 200' with the light emitted from light emitting element 210 at a relatively small light emission angle without forming an excessively bright part directly above light emitting device 200'. On the other hand, light which is emitted from light emitting element 210 at a large light emission angle is controlled, while being concentrated, by light flux controlling member 220' to travel toward a region further from central axis CA on the inner surface of diffusion plate 130. Accordingly, the light emitted from light emitting element 210 at a large light emission angle travels toward the edge of a region to be irradiated with the light emitted from one light emitting device 200'. The convergence of light emitted from light emitting element 210 at a large light emission angle is adjusted so that the brightness of each region to be irradiated becomes substantially the same at the edge and central portion therein, as two regions to be irradiated with light emitted from respective two adjacent light emitting devices 200' overlap at the edges of the regions.

Figure 7A:
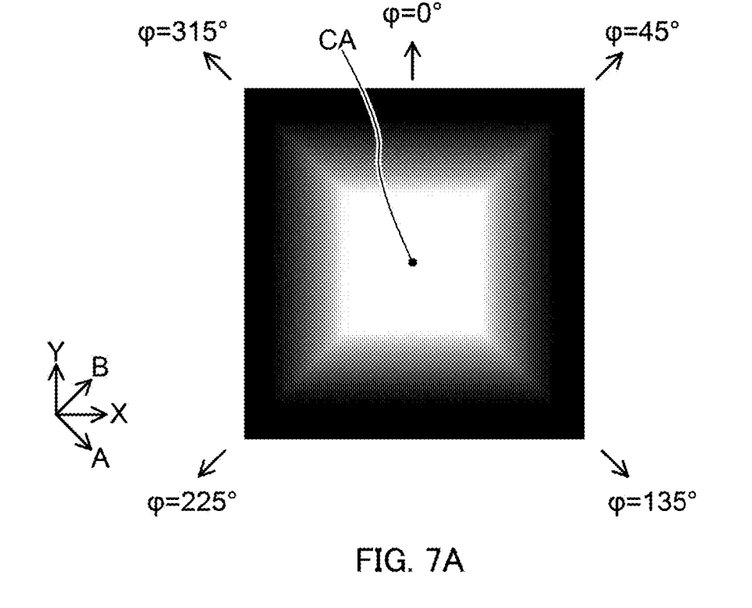
FIG. 7A illustrates, in the surface light source device having the light flux controlling member including no gate mark, illuminance distribution on the inner surface of a diffusion plate when light emitted from one light emitting device illuminates the inner surface of the diffusion plate.

FIG. 7A illustrates illuminance distribution on the inner surface of diffusion plate 130 irradiated with light emitted from light source device 200' having light flux controlling member 220'. For showing the light control by incidence surface 222 and emission surface 226, illuminance distribution is shown also for light emitting device 200' having light flux controlling member 220' including no gate mark 227 in FIG. 7A. As shown in FIG. 7A, light emitted from light emitting device 200' which has light flux controlling member 220' having incidence surface 222 and emission surface 226 illuminates the inner surface of diffusion plate 130 substantially in a shape of a quadrangle.

Herein, horizontal angle φ in each of light emitting devices 200 and 200' is defined as an angle that becomes larger in a clockwise direction with central axis CA as a reference axis and the Y-axis direction, which is orthogonal to central axis CA, as 0°. In Y-axis direction, φ is 0°, and in X-axis direction, φ is 90°. When light emitted from one light emitting device 200' illuminates the inner surface of diffusion plate 130 substantially in the shape of n-polygon as described above, the illuminance distribution on the inner surface of diffusion plate 130 has anisotropy such that the light reach further in the direction of at least one predetermined horizontal angle φ (specifically, in the direction corresponding to each corner of the substantially n-polygonal shape) compared to other directions. In the example shown in FIG. 7A, the illuminance distribution on the inner surface of diffusion plate 130 has anisotropy such that the light reach further in the directions of φ of 45° (B-direction), φ of 135° (A-direction), φ of 225° and φ of 315° compared to other directions.

In light flux controlling member 220 according to the present embodiment as described above, incidence surface 222 has circular symmetry, and emission surface 226 has four-fold symmetry, whose outer edge has a substantially quadrangular shape. Light emitted from light emitting device 200 having light flux controlling member 220 illuminates the inner surface of diffusion plate 130 substantially in a shape of a quadrangle (when light flux controlling member 220 includes no gate mark 227). That is, incidence surface 222 and emission surface 226 are formed in such a manner that, on the assumption that light is emitted from light emitting device 200 in a state where light flux controlling member 220 includes no gate mark 227, illuminance distribution on diffusion plate 130 has anisotropy such that the light reaches further in the direction of at least one predetermined horizontal angle φ compared to other directions.

Gate mark 227 is a mark formed by resin injection on a part of the outer peripheral portion of light flux controlling member 220 when light flux controlling member 220 according to the present embodiment is formed by injection molding. There are various gate types for injection molding, such as a direct gate, a side gate and a pin gate. Light flux controlling member 220 according to the present embodiment is formed by the side gate in which a gate part is connected to the side surface of light flux controlling member 220.

Figure 5E:
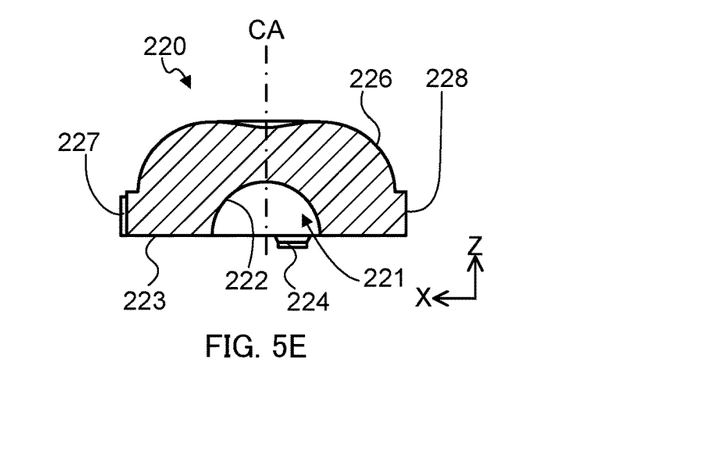

Gate mark 227 may be a remaining gate protruding from the outer peripheral portion of light flux controlling member 220, or a gate cut part formed on substantially the same plane as the outer peripheral portion of light flux controlling member 220 by cutting the gate so that the gate does not remain. Gate mark 227 may be positioned on the outer peripheral portion of light flux controlling member 220. For example, gate mark 227 may be formed on a part of the outer peripheral portion of emission surface 226. When light flux controlling member 220 further includes a flange 228 protruding from the outer edge of emission surface 226 in the direction(s) orthogonal to central axis CA as illustrated in FIG. 5E, gate mark 227 may be formed on a part of the flange 228. In the present embodiment, gate mark 227 is a remaining gate protruding from the outer peripheral portion of emission surface 226.

Figure 7B:
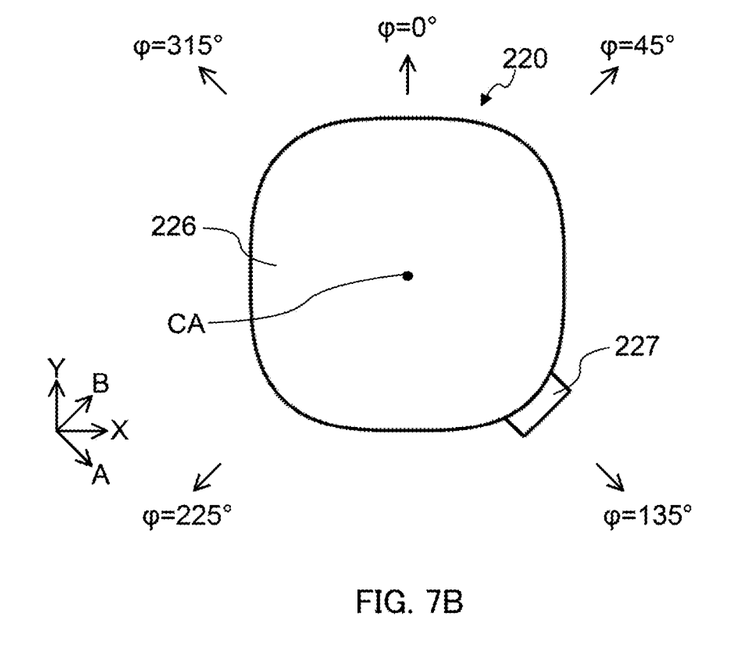
FIG. 7B is a plan view of a light flux controlling member according to an embodiment of the present invention for explaining the position of a gate mark.

As described above, incidence surface 222 and emission surface 226 are formed in such a manner that, on the assumption that light is emitted from light emitting device 200 in a state where light flux controlling member 220 includes no gate mark 227, illuminance distribution on diffusion plate 130 has anisotropy such that the light reaches further in a direction of at least one predetermined horizontal angle φ (as shown in FIG. 7A, angles φ of 45°, 135°, 225° and 315° in the present embodiment) compared to other directions. In light flux controlling member 220 according to the present embodiment, gate mark 227 is located on the outer peripheral portion of light flux controlling member 220 in such a manner that the range of horizontal angles φ (i.e., horizontal-angle-φ range) of gate mark 227 includes one of the at least one predetermined horizontal angle φ (angles φ of 45°, 135°, 225° and 315°). In the present embodiment, gate mark 227 is located so that the range includes φ of 135° as illustrated in FIG. 7B.

The following can be said from another perspective. Emission surface 226 has a shape of n-fold symmetry, whose outer edge has a substantially n-polygonal shape (where n is an integral number of three or more), and the range of horizontal angles φ of gate mark 227 includes a horizontal angle φ corresponding to any one of the corners of the substantially n-polygonal shape. In emission surface 226 having n-fold symmetry with its outer edge having the substantially n-polygonal shape, a ridge line connecting central axis CA and each corner of the substantially n-polygonal shape is formed, and light is concentrated to some degree in the direction including the ridge line (at horizontal angle φ) and thus reaches further. In a cross section, orthogonal to the ridge line, of a part including the ridge line, the ridge line part may be a clearly defined angle or a rounded curve. In the present embodiment, emission surface 226 has a shape of four-fold symmetry, whose outer edge has a substantially quadrangular shape, and the range of horizontal angles φ of gate mark 227 includes a horizontal angle φ (135°) corresponding to one of the corners of the substantially quadrangular shape.

By the above manner, gate mark 227 is located in the direction (of the predetermined horizontal angle φ) so that emitted light reaches further compared to other directions (of other horizontal angles φ), in illuminance distribution having anisotropy due to light emitting device 200 (200'). Since gate mark 227 cannot appropriately control the traveling direction of light, a dark part is more likely to occur in the direction in which gate mark 227 is located. However, the disposition of gate mark 227 in the above manner enables the generation of a dark part due to gate mark 227 to become less prominent.

In emission surface 226 having a shape of n-fold symmetry with its outer edge having the substantially n-polygonal shape, horizontal angles φ corresponding to respective corners of the substantially n-polygonal shape can be referred to as horizontal angles φ1 to φn. Regarding light emitting devices 200 capable of making the generation of a dark part due to gate mark 227 become less prominent, the effect of the light emitting devices 200 becomes more remarkable when they are arranged on the bottom surface of surface light source device 100. The preferable disposition of light emitting devices 200 in surface light source device 100 can be described as follows: "light emitting devices 200 are disposed in such a manner that a corner, which corresponds to horizontal angle φn and where gate mark 227 is located, at the outer edge of emission surface 226 in light emitting device 200a faces a corner, which corresponds to one of horizontal angles φ 1 to φn−1 and where gate mark 227 is not located, at the outer edge of emission surface 226 in light emitting device 200b adjacent to light emitting device 200a." That is, between two adjacent light emitting devices 200, it is preferred to dispose light emitting devices 200 so that angles of the respective outer edges of emission surfaces 226 face each other, but respective gate marks 227 do not face each other.

(Simulation)

The illuminance distribution was simulated for the inner surface of diffusion plate 130 in surface light source device 100 which uses above described light flux controlling member 220. In the simulation, 16 light emitting devices 200 were disposed in a square lattice shape in surface light source device 100, and all the light emitting devices 200 were lit up. As a comparison, simulation was also performed for a surface light source device using light flux controlling members with no gate mark being formed (hereinafter also referred to as "surface light source device according to Comparative Example 1") and a surface light source device using light flux controlling members each having a gate mark formed in the direction of angle φ of 180° (the range of horizontal angles φ of the gate mark has none of the at least one predetermined horizontal angle φ) (hereinafter also referred to as "surface light source device according to Comparative Example 2"). The disposition of light emitting devices 200 in surface light source device 100 according to the present embodiment was the same as the disposition of light emitting devices in the surface light source devices according to the Comparative Examples 1 and 2.

Figure 8A:
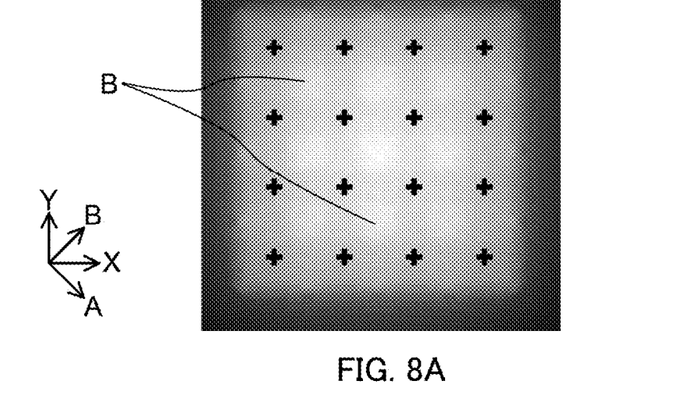
FIGS. 8A to 8C show simulation of illuminance distribution in surface light source devices according to Comparative Example 1, Comparative Example 2 and the present embodiment, respectively.
Figure 8B:
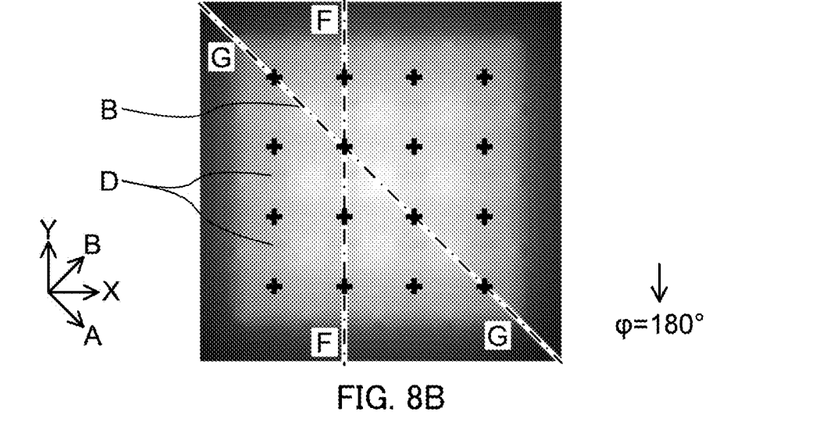
Figure 8C:
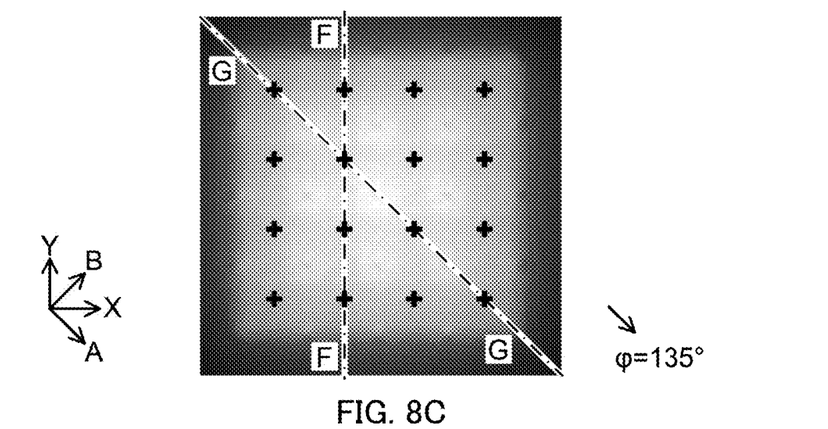

FIGS. 8A and 8B show simulation of illuminance distribution in the surface light source devices according to Comparative Example 1 and Comparative Example 2 respectively, and FIG. 8C shows simulation of illuminance distribution in surface light source device 100 according to the present embodiment. In FIGS. 8A to 8C, "+" mark represents the position of a light emitting device.

Figure 9A:
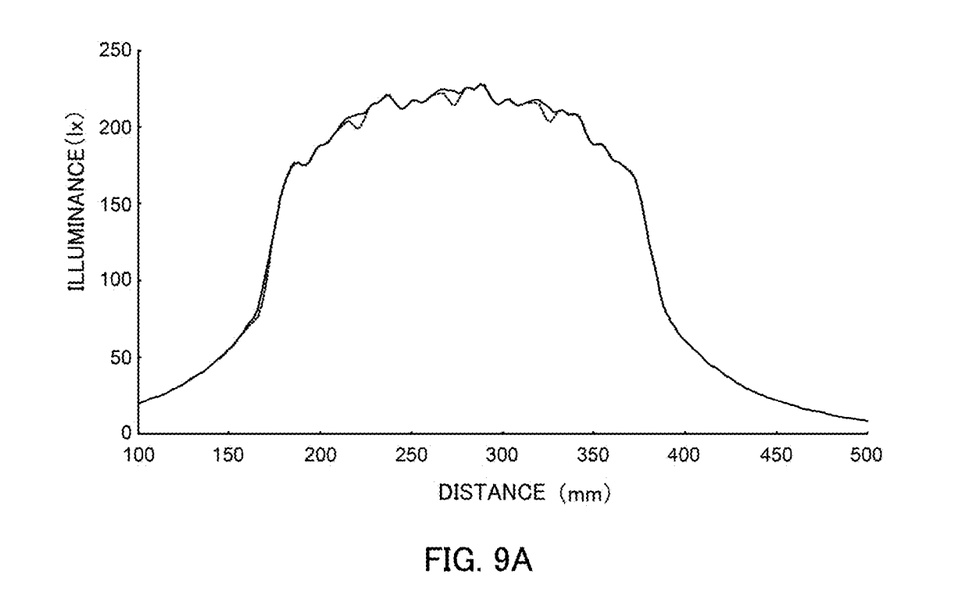
FIG. 9A is a graph showing illuminance on lines F-F in respective FIGS. 8B and 8C.
Figure 9B:
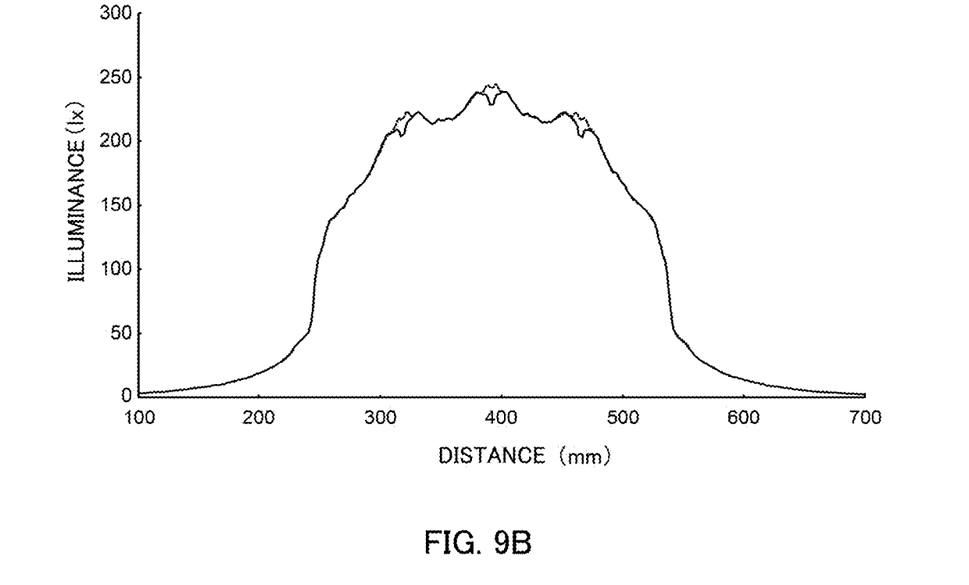
FIG. 9B is a graph showing illuminance on lines G-G in respective FIGS. 8B and 8C.

FIG. 9A is a graph showing illuminance on lines F-F in respective FIGS. 8B and 8C, and FIG. 9B is a graph showing illuminance on lines G-G in respective FIGS. 8B and 8C. The solid line and the broken line show the illuminance in surface light source device 100 according to the present embodiment and the surface light source device according to Comparative Example 2, respectively.

In the surface light source device according to Comparative Example 1 (with no gate mark), bright parts B were generated in regions which are positioned in the directions of angles φ of 45° (B-direction), 135° (A-direction), 225° and 315° relative to each light emitting device (see FIG. 8A). The reason for this is considered that each light emitting device illuminates the inner surface of diffusion plate 130 substantially in a shape of a quadrangle, and thus regions to be irradiated which are substantially in shapes of quadrangles overlap at the corners of the regions. Further, as shown in FIGS. 8B and 9A, in the surface light source device according to Comparative Example 2 (with a gate mark in the direction of angle φ of 180°), not only bright parts B were generated in regions which are positioned in the directions of angles φ of 45° (B-direction), 135° (A-direction), 225° and 315° relative to each light emitting device (see FIGS. 8B and 9B (broken line)), but also dark part D was generated in a region which is positioned in the direction of angle φ of 180° relative to each light emitting device. The reason for this is considered that as gate mark 227 was provided in place of a part of emission surface 226, the traveling direction of light could not have been appropriately controlled at gate mark 227.

On the other hand, in surface light source device 100 (with a gate mark in the direction of φ of 135°) according to the present embodiment, no dark part D was generated in a region which is positioned in the direction of angle φ of 180° relative to each light emitting device 200 (see FIG. 9A (solid line), and the illuminance was lowered in bright parts B generated in regions which are positioned in the directions of angles φ of 45° (B-direction), 135° (A-direction), 225° and 315° relative to each light emitting device 200 (see FIG. 9B (solid line)), and thus the illuminance unevenness was improved. The reason for this is considered that the bright parts which tend to be formed at the corners of an n-polygonal region to be irradiated compensate for the dark parts which tend to be formed due to gate marks 227. As gate mark 227 is located at a position corresponding to one of the predetermined horizontal angles φ (angles φ of 45°, 135°, 225° and 315° in the present embodiment), single light emitting device 200 having light flux controlling member 220 according to the present embodiment can suppress luminance unevenness caused by gate mark 227 regardless of the direction of light flux controlling member 220.

Effects

As described above, surface light source device 100 according to the present embodiment uses light flux controlling member 220 having gate mark 227 formed in a predetermined direction, and therefore can suppress luminance unevenness caused by a gate mark regardless of the direction of light flux controlling member 220.

In light flux controlling member 220 according to the present embodiment, the outer edge of emission surface 226 is formed substantially in a shape of a quadrangle; however, the present invention is not limited to this configuration. For example, the outer edge of an emission surface may be in a shape having only one corner (edge) in the direction of one horizontal angle φ, such as a drop shape. In such a case, a gate mark formed at a position corresponding to the corner can compensate for a dark part, using a tendency of a bright part which is more likely to be generated in the direction of the corner.

This application claims priority based on Japanese Patent Application No. 2016-068400, filed on Mar. 30, 2016, the entire contents of which including the specification and the drawings are incorporated herein by reference.

INDUSTRIAL APPLICABILITY

The surface light source device, display apparatus, and light flux controlling member according to the present invention may be employed, for example, in a backlight of a liquid crystal display apparatus or a general lighting.

REFERENCE SIGNS LIST

10 Surface light source device
20 Support board
30 Circuit board
40 Light emitting diode
50 Reflective sheet
52 Hole
60 Lens
62 Protrusion
100 Surface light source device
110 Casing
112 Bottom plate
114 Top plate
120 Substrate
130 Diffusion plate
200, 200' Light emitting device
210 Light emitting element
220, 220' Light flux controlling member
221 Recess
222 Incidence surface
223 Rear surface
224 Leg
225 Ejector pin mark
226 Emission surface
226a First emission surface
226b Second emission surface
226c Overhanging part
227 Gate mark
CA Central axis of light flux controlling member
OA Optical axis of light emitting element

The invention claimed is:

1. A surface light source device, comprising:
a substrate;
at least one light emitting device including a light emitting element disposed on the substrate, and a light flux controlling member disposed above the light emitting element so that a central axis of the light flux controlling member coincides with an optical axis of the light emitting element, the light flux controlling member being configured to control a distribution of light emitted from the light emitting element; and
a diffusion plate disposed above the at least one light emitting device, the diffusion plate being configured to transmit the light from the at least one light emitting device while diffusing the light,
wherein the light flux controlling member includes:
an incidence surface which is an inner surface of a recess disposed on a substrate side of the light flux controlling member so as to intersect the central axis,
an emission surface disposed on a diffusion plate side of the light flux controlling member so as to intersect the central axis, and
a gate mark located on a part of an outer peripheral portion of the light flux controlling member; and
wherein:
when, in the at least one light emitting device, a horizontal angle φ is defined with the central axis as a reference axis and a predetermined direction orthogonal to the central axis as 0°,
the incidence surface and the emission surface are formed in such a manner that, if light is emitted from the at least one light emitting device in a state where the light flux controlling member includes no gate mark, illuminance distribution on the diffusion plate has anisotropy such that the light reaches further in a direction of at least one predetermined horizontal angle φ compared to other directions, and
the gate mark is located in such a manner that a horizontal-angle-φ range of the gate mark includes one of the at least one predetermined horizontal angle φ.

2. The surface light source device according to claim 1, wherein:
the emission surface has a shape of n-fold symmetry such that an outer edge of the emission surface has a substantially n-polygonal shape, where n is an integral number of three or more, and
the horizontal-angle-q range of the gate mark includes a horizontal angle $\varphi$ corresponding to one of corners of the substantially n-polygonal shape.

3. The surface light source device according to claim 2, wherein:
the emission surface has a shape of four-fold symmetry such that an outer edge of the emission surface has a substantially quadrangular shape, and
the horizontal-angle-q range of the gate mark includes a horizontal angle $\varphi$ corresponding to one of corners of the substantially quadrangular shape.

4. The surface light source device according to claim 1, wherein the gate mark is located on a part of an outer peripheral portion of the emission surface.

5. The surface light source device according to claim 1, wherein:
the light flux controlling member further includes a flange protruding from an outer edge of the emission surface in a direction orthogonal to the central axis, and
the gate mark is located on a part of the flange.

6. The surface light source device according to claim 1, wherein the light flux controlling member further includes:
a rear surface extending from an opening edge of the recess in a direction orthogonal to the central axis, and
two or more legs protruding from the rear surface toward the substrate side, wherein the two or more legs are disposed symmetrically relative to a virtual plane which passes through the central axis and the gate mark, the virtual plane being parallel to the central axis.

7. The surface light source device according to claim 6, wherein the light flux controlling member further includes one or more ejector pin marks located on the rear surface, and wherein the one or more ejector pin marks are located symmetrically relative to the virtual plane.

8. The surface light source device according to claim 1, wherein the gate mark is a remaining gate.

9. The surface light source device according to claim 1, wherein the at least one light emitting device includes a plurality of light emitting devices, and
wherein the plurality of light emitting devices are disposed so that the gate marks are directed in one direction.

10. A display apparatus, comprising:
the surface light source device according to claim 1, and
a display member to be irradiated with the light emitted from the surface light source device.

11. A light flux controlling member, comprising:
the light flux controlling member configured to be used in the surface light source device according to claim 1.

* * * * *

UNITED STATES PATENT AND TRADEMARK OFFICE
CERTIFICATE OF CORRECTION

PATENT NO. : 10,627,675 B2
APPLICATION NO. : 16/090333
DATED : April 21, 2020
INVENTOR(S) : Kensuke Hiraka It is certified that error appears in the above-identified patent and that said Letters Patent is hereby corrected as shown below:

On the Title Page

Item (73), under "Assignee", in Column 1, delete "Enpias Corporation" and insert --Enplas Corporation,-- therefor.

Signed and Sealed this
Twenty-eighth Day of July, 2020

Andrei Iancu
*Director of the United States Patent and Trademark Office*